June 13, 1939.　　　　R. HIGGINS　　　　2,162,280
INSULATION TESTING
Filed June 29, 1938　　　3 Sheets-Sheet 1

INVENTOR
Ralph Higgins
BY Alpheus J. Crane
ATTORNEY

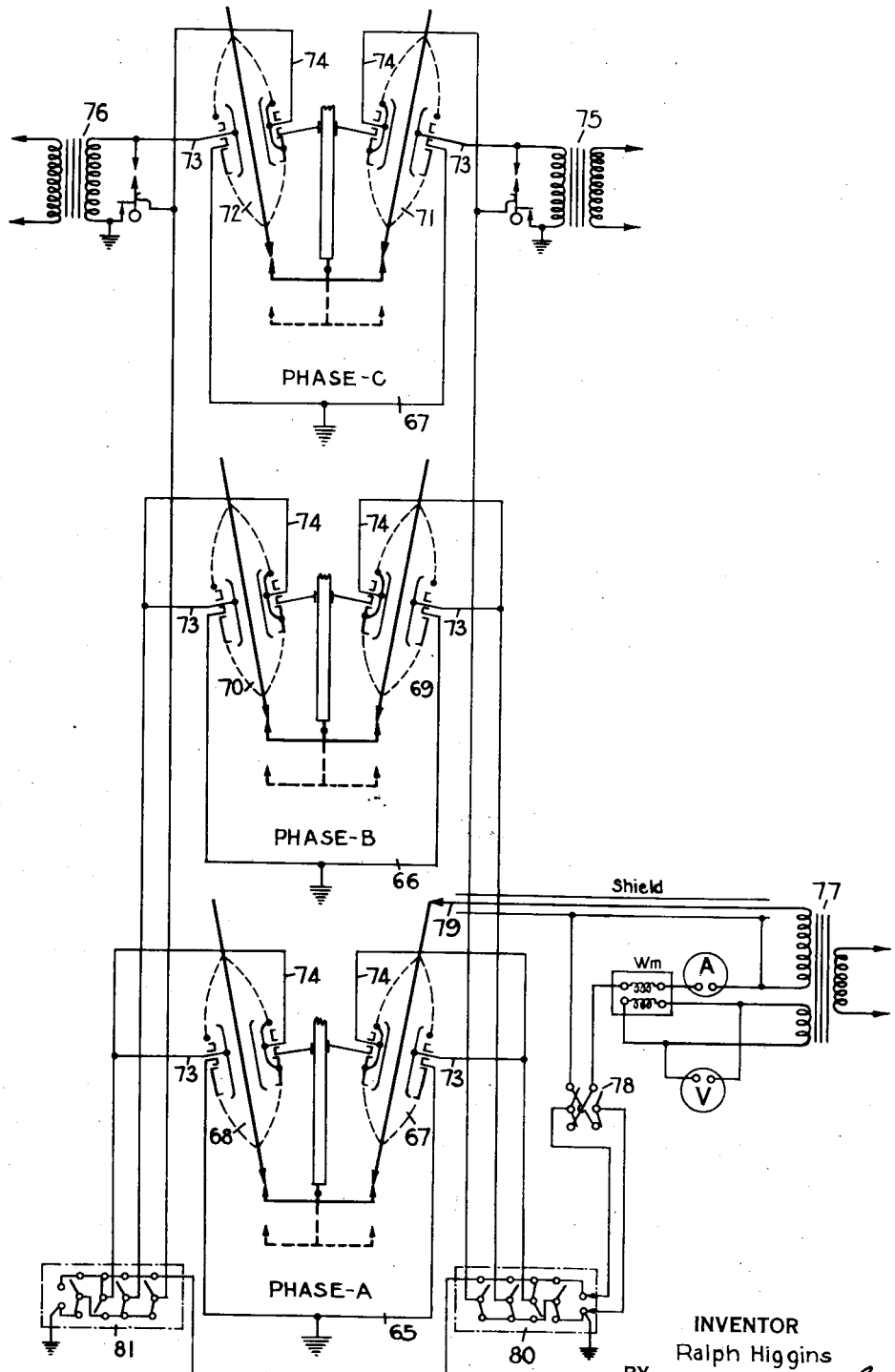

Patented June 13, 1939

2,162,280

UNITED STATES PATENT OFFICE 2,162,280

INSULATION TESTING

Ralph Higgins, Akron, Ohio, assignor to The Ohio Brass Company, Mansfield, Ohio, a corporation of New Jersey Application June 29, 1938, Serial No. 216,487

10 Claims. (Cl. 175—183)

This invention relates to electrical measurements and particularly to a method and apparatus for testing the insulation of electrical apparatus after it has been in service for some time.

One object of the invention is to provide a method and apparatus for testing electrical apparatus without interfering seriously with the operation of the apparatus.

A further object of the invention is to provide for separately testing different parts of connected apparatus.

A further object of the invention is to provide for testing the insulation of an electrical apparatus contained in a housing separately from the insulation of the bushing extended into the housing.

A further object of the invention is to provide a method and means for electrical testing which shall be of improved construction and operation.

Other objects and advantages will appear from the following description.

The invention is exemplified by the combination and arrangement of parts shown in the accompanying drawings and by the steps of the process described in the specification.

The invention is illustrated in the accompanying drawings in which:

Fig. 5 is a diagram showing the wiring connection of the invention to a polyphase switching system.

This invention is a continuation in part of my prior application Serial No. 152,971 filed July 9, 1937.

The usual procedure in testing insulation deterioration has heretofore been by the so-called power factor testing process, using one of the various makes of power factor testing sets now on the market. All such methods require the equipment to be tested to be deenergized by disconnection from service during the test. For this reason it is highly important to employ a method of testing whereby the necessary readings can be taken quickly so that the equipment may be put back in service as soon as possible. Also, any means employed to reduce the time required for this test will, in a course of time, result in considerable saving by enabling the testing personnel to cover more ground in a given time.

In measuring the internal insulation of various types of equipment, it is highly desirable to separate the losses in the bushing insulators leading to the equipment from the losses in the equipment itself. In the case of power transformers and the like the magnitude of the watts loss and current in the winding insulation as compared with that of the bushings will easily obscure any deterioration in the bushing insulation. In the past, various methods have been used to isolate the bushings from the apparatus, as by lifting the bushings and inserting insulating blocks underneath the flange or by disconnecting the leads to the windings through the bushings. Sometimes it is quite possible to eliminate the bushing losses by taking numerous sets of readings. However, such methods require considerable time to obtain accurate readings.

By means of the present invention rapid field testing of equipment insulation can be accomplished without disturbing the main connections between the bushings and the equipment under test and with a minimum amount of time required. Also, by means of the invention, the power factor of the bushings themselves can be determined very readily.

In practicing the invention the bushings are equipped with a small insulating outlet tap through the flange which I shall call a shield tap in order to distinguish it from the so-called capacitance tap, sometimes provided on bushings as a source of low voltage energy. As explained in my prior application referred to above, this shield tap need only be insulated for a few hundred volts as compared with the several thousand volts insulation required for capacitance taps.

Figure 1:
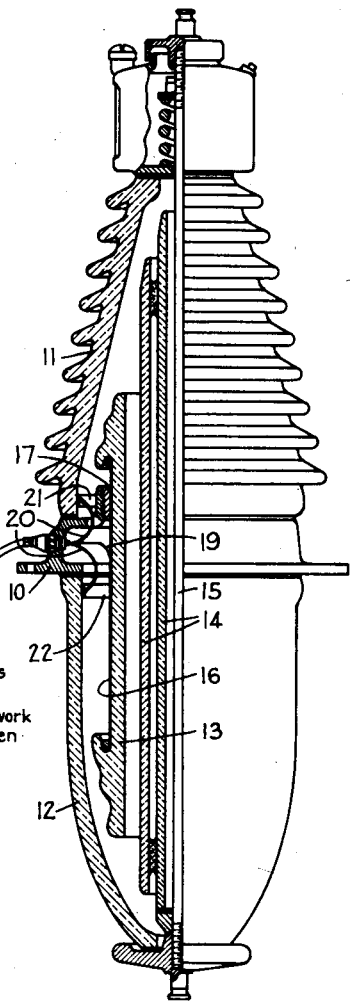
Fig. 1 is a part elevation and part section showing a bushing insulator equipped according to the present invention.

In Fig. 1 of the drawings there is shown one form of shield tap applied to a standard oil filled bushing. This figure shows a type of bushing generally used on power transformers and the like. The bushing is provided with the usual supporting flange 10, cone 11, dome 12, keg 13, tubes 14 and conductor 15. In this case a portion of the surface of the keg 13 is metallized as shown at 16 to provide a ground shield which is insulated from the supporting flange by means of an insulating cement joint 17 and connected to the shield tap 18 by a jumper 19. The shield tap is also connected by jumper 20 to narrow metallized zones 21 and 22 on the inside of the porcelain cone and dome 11 and 12, respectively.

By means of these connections, when the bushing is being energized to test its insulation according to the present invention, the ground current from the shield tap 18 will consist of both the capacitance charging current and the leakage currents over the tube assemblies and the inside of the upper and lower porcelain sheds. With the connections shown in Fig. 1 the external leakage current over the lower porcelain shed or dome will not be measured by the meter attached to the shield tap 18, but only the internal bushing current will be measured. As a rule, it is only the internal insulation of the bushing that needs to be checked for deterioration. Should there be any excessive leakage over the external surface of the lower porcelain shed due to sludging, etc., this condition will show up in the readings taken on the equipment insulation as will be explained later. Also, when these bushings are installed on such apparatus as power transformers any deposit on the outside of the lower porcelain dome is apt to be very small and so can be disregarded. Likewise, external leakage current over the upper porcelain shed or cone is usually negligible as all such bushings are cleaned periodically when their appearance shows that cleaning is required, and since the equipment insulation test is usually made during fair weather, it has been found that this external leakage current can be disregarded.

Figure 2:
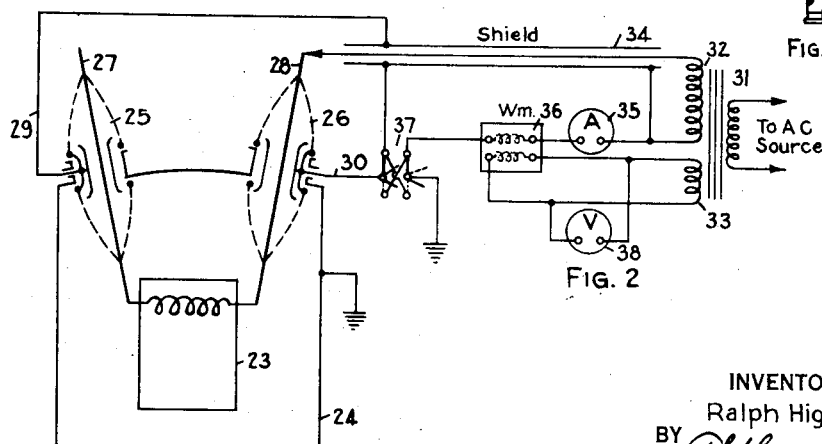
Fig. 2 is a diagram of one wiring arrangement which may be used for practicing the invention.

Fig. 2 shows how it is possible by means of the present invention, to measure the insulation of high voltage equipment, such as a power transformer without disconnecting the high voltage bushings when the apparatus to be tested is equipped with the type of bushing shown in Fig. 1. This arrangement utilizes a typical power factor testing method in which the power factor is determined by the well known process of taking wattmeter, ammeter and voltmeter readings. Electrical apparatus 23, such as a transformer, is contained in a housing 24 having bushing insulators 25 and 26 for the lead in conductors 27 and 28. The housing 24 is grounded and the bushings are equipped with shield taps 29 and 30 like the tap 18 in Fig. 1. The power factor test set includes a transformer 31 having secondary windings 32 and 33. One lead from the secondary winding 32 extends through a shield 34 to the lead 28. The other lead from the winding 32 extends through the ammeter 35 and the current coil of the wattmeter 36 to the double pole double throw switch 37. The voltmeter 38 and the potential coil of the wattmeter 36 are connected to the secondary 33. The shield 34 is connected to the terminal of the secondary 32 opposite that connected to the lead passing through the shield. By means of switch 37 with the switch in the upper position shown in full lines, the bushing charging current is diverted to the shield 34 of the test set away from the measuring instruments thereby eliminating the effect of the bushings on the readings of the various instruments. With this connection, the instruments will read only the power factor of the apparatus insulation. With the switch in the down position, shown in broken lines, the charging current for the bushing 26 passes through the current coils of the instruments and the power factor value thus obtained will be that of the bushing proper. As shown in this diagram, the lead from the shield tap of only one bushing is connected to one centre pole of the switch 37 and the shield tap from the other bushing is connected to the shield of the test set. The power factor of the other bushing 25 can be determined by interchanging these two shield tap connections.

Figure 3:
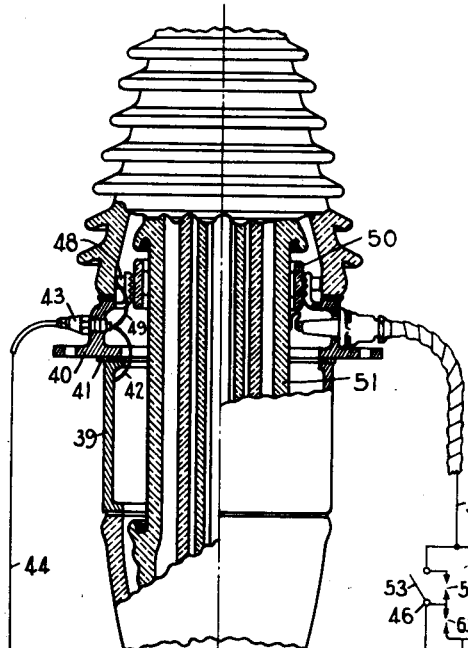
Fig. 3 is a part elevation and part section of a bushing insulator different slightly from that in Fig. 1 but also equipped for use in connection with the present invention.

In the case of oil circuit breakers and the like where there is apt to be considerable sludge deposits, etc. on the outside of the lower dome of the bushing, it may be desirable to separate the leakage current over the lower end of the bushing from the measurements taken on the equipment insulation. Also, the bushings used on this class of equipment are usually equipped with a capacitance tap to operate various instruments such as synchroscopes, voltmeters, relays and the like. On this class of service, bushings having a ground sleeve construction, as shown in my prior Patent No. 2,082,055, are generally used. Fig. 3 shows a bushing of this type equipped with a capacitance tap 38 that may be used also for a shield tap, together with means by which the external leakage current over the dome may be added to the bushing charging current. Here the ground sleeve 39, which is made a separate member from the flange 40, may be insulated from the flange by a heavy resilient insulating gasket 41 made of such material as is now on the market under the trade name of "Corprene" or similar material consisting of fine grains of cork with an oil resistant rubber substitute as a binder. The ground sleeve 39 may be electrically connected to the shield tap 38 by means of a jumper connected through a bushing 43 and lead 44 to a meter connection 45. The tap 38 may also be connected to the meter connection 45 by switching mechanism 46 connected with the transformer 47. This switching mechanism is shown more in detail in Fig. 4. By this arrangement, the shield tap current will now include both the internal and external leakage currents over the lower end of the bushing, together with the internal leakage current on the inside of the upper bushing cone, which is directed to the lead 44 by means of conducting band 48 and jumper 49. In case this type of bushing is not equipped with a capacitance tap, the internal ground shield of the bushing may be connected to the shield tap as shown in Fig. 1. However, where this type of bushing is equipped with a capacitance tap, additional insulation 50 is required between the flange 40 and the ground shield 51 as shown. The ground shield 51 is usually connected through a highly insulated cable lead 38 to the transformer network 47 employed to supply the source of low voltage energy. As a rule, the transformer on this potential device is protected on the primary side by a small discharge gap 52 as shown. Also, this gap is usually paralleled by a suitable shorting switch 53 called a grounding switch. The purpose of this switch is to deenergize the potential device 47 when it is required to service or to make changes on the low tension side of the transformer. In order to include the main capacitance current of the bushing with the total charging current for power factor measurements, it is proposed to insulate the ground side of this switch 47 and connect this to the lead 62 from the shield tap as shown. By means of the double throw switch 54, the tap leads are grounded either through the instruments or direct to ground as desired. Due to the high impedance of the potential device transformer, it is not necessary to disconnect this winding from the circuit.

Figure 4:
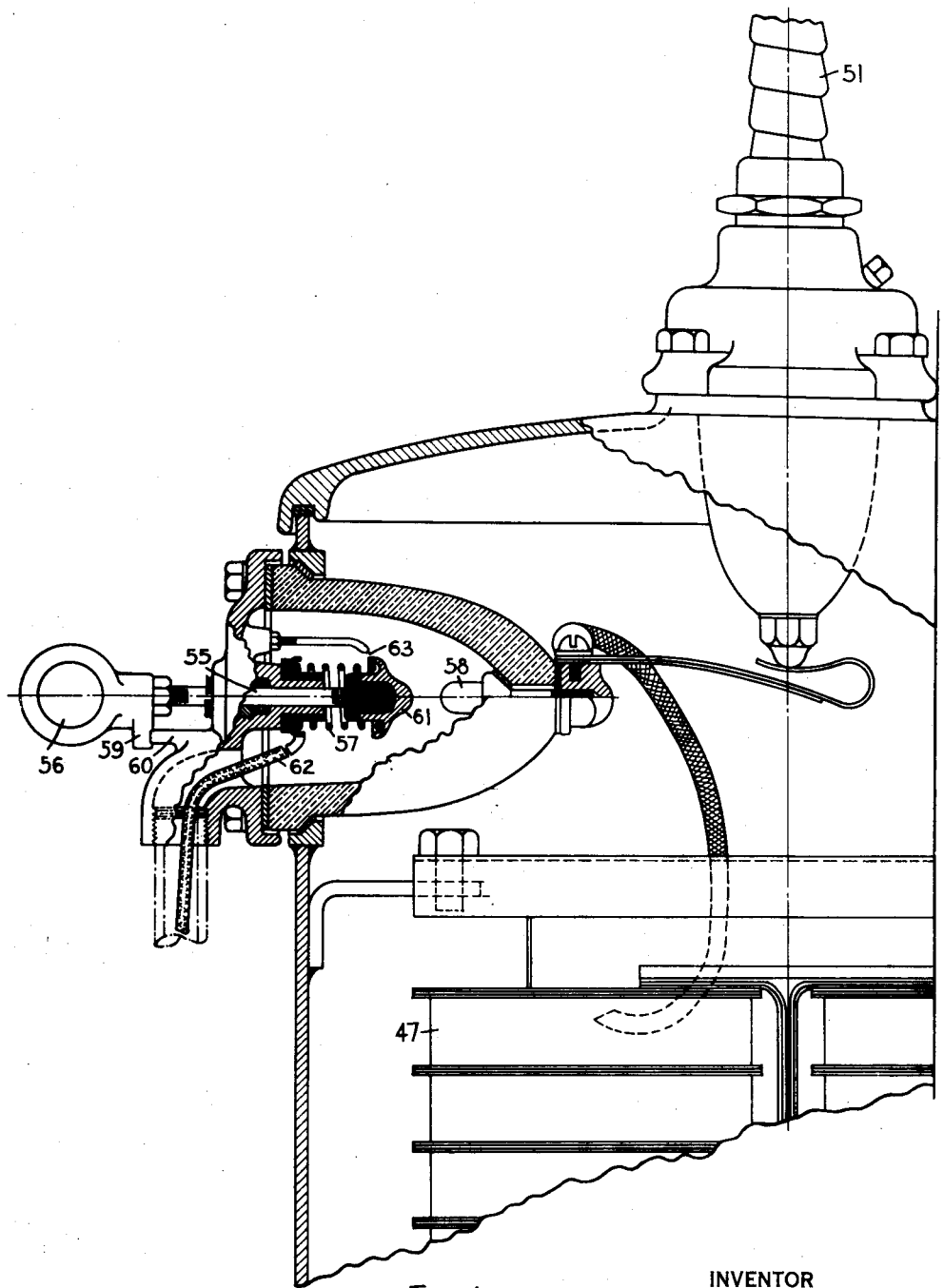
Fig. 4 is a part elevation and part section of a switching mechanism forming a part of the present invention.

The construction of the switching mechanism just described is shown more in detail in Fig. 4 wherein a combination grounding switch and protective gap as assembled on a standard capacitance potential device transformer, the switching mechanism consists essentially of a plunger 55 having an eye 56 on one end so that it may be readily operated by means of a standard "operator stick". A spring 57 is used to close the gap between the end of the plunger and the live electrode 58 and the gap is held open by means of a lug 59 on one side of the eye casting engaged against a projection 60 on the outer housing as shown. To close the switch it is only necessary to give the plunger a slight outward movement and then rotate it, disengaging the lug on the eye casting from the projection on the housing. The spring will then be sufficient to close the gap between the two electrodes 58 and 61 thus grounding the winding of the transformer through the electrode 61, spring 57 and lead 62. When this switch is in the open position the small gap between the live terminal 58 and the electrode 61 on the end of the plunger serves as a small discharge gap for surge protection. The electrode 61 on the end of the plunger must be insulated from the plunger and likewise the spring which bears against the electrode must be insulated from the housing as shown. The lead 62 attached to this spring provides the required connection to the shield tap lead 45 and switch 54 as shown in Fig. 3. As a precaution against this lead being open circuited for any reason, a small auxiliary gap 63 is provided as shown, to pass any surge to ground, thus giving the transformer adequate surge protection at all times.

To facilitate rapid testing of the bushing and equipment insulation in the field, it is proposed to connect the shield tap leads from each bushing through a shielded cable to small junction boxes containing a gang of instruments or plug switches. These switches may be the usual type used on current transformer and secondary leads in which contact is made on one throw before the other short is broken.

Fig. 5 shows a typical arrangement for a standard three pole oil circuit breaker equipped with the type of bushing shown in Fig. 3. The numerals 65, 66 and 67 designate the circuit breaker houses for the different phases of a three phase line. Each breaker has two bushings, the bushings being numbered 67, 68, 69, 70, 71 and 72, respectively. Each bushing is equipped with a capacitance tap 73 and a shield tap 74. The capacitance taps from the bushings 71 and 72 of phase C are shown provided with potential devices 75 and 76 for adapting the current from the capacitance tap for use as a source of limited low voltage energy supply. As a rule, these bushings, equipped with capacitance taps may or may not be connected to a potential device transformer. Where the potential device transformer is not used, the lead from the capacitance tap may be connected in parallel with the shield tap lead as shown for the breakers on phases B and A. A single power factor test set 77 serves for all the bushings and it is equipped with a switch like the switch 37 in Fig. 2 for separating bushing measurements from the apparatus measurements. The shielded conductor 79 may be connected with the conductor of any bushing to be tested and the corresponding shield tap may be connected to the power factor meter by means of the switches 80 and 81 with their connections with the shield and capacitance taps on the various bushings. With the power factor test equipment connected to one bushing of one pole of the breaker, the bushing 67 as shown, the various insulation readings of the bushing and of the breaker, either open or closed, can be obtained very quickly by means of the double throw switches provided. It is only necessary to transfer the shielded lead from the test set to each high voltage bushing in turn to complete a whole set of readings required for this three pole breaker. Where the bushings are equipped as 71 and 72 with the potential device transformers and grounding switches as described previously, it is necessary to close the grounding switch while the readings are being taken.

In case the oil circuit breaker has not been equipped with bushings having shield taps but with bushings having only standard capacitance tap connections, it is still possible to employ the other portions of the invention described with fairly accurate results. In this event, the switch connections will be the same as shown in Fig. 4. The accuracy of the results of readings thus obtained without the leakage current connections will depend somewhat on the internal condition of the bushings which are only equipped with capacitance tap. With well designed bushings in which the oil or dielectric medium is kept in good condition to reduce sludging, any internal leakage current over the upper and lower porcelain sheds will be so small that the effect of these currents will be negligible. Hence, the individual readings taken on the bushings measuring only the capacitance tap current will give a fair indication of the bushing's condition. In this case, the loss current over the outside of the lower porcelain dome of the bushings will be added to the readings taken on the equipment insulation.

I claim:

1. The combination with a conductor of a source of alternating voltage having one electrode thereof connected with said conductor, electrical apparatus having two capacitance paths from said conductor to the other electrode of said source, metering apparatus, means for directing the charging current for one of said capacitance paths through said metering apparatus and a shunt for directing at the same time the current of the other capacitance path away from said metering apparatus.

2. The combination with electrical apparatus having a conductor of means for charging said conductor, parallel capacitance paths from said conductor through said apparatus, a metering device, a shunt for by-passing current about said metering device, and means for selectively directing the capacitance current in either of said capacitance paths, either through said metering device or through said shunt.

3. In combination a housing, electrical apparatus disposed within said housing, a bushing insulator extending through said housing and having a conductor extending therethrough, means for charging said conductor, means for separating the charging current for said bushing from the charging current for said apparatus, a metering device, a shunt for by-passing current about said metering device, and means for selectively directing the separated charging current for said bushing either through said metering device or through said shunt.

4. In combination a housing, electrical apparatus disposed within said housing, a bushing insulator extending through the wall of said housing, a conductor connected with said apparatus and insulated from said housing by said bushing insulator, means for charging said conductor, metering apparatus, a shunt for by-passing current about said metering apparatus, and means for directing the charging current for said electrical apparatus either through said metering apparatus or through said shunt independently of the charging current for said bushing.

5. The combination with a housing of electrical apparatus disposed within said housing, a conductor connected with said electrical apparatus and extending through an opening in the wall of said housing, a bushing insulator for said conductor, means for charging said conductor, a power factor meter, a shunt for by-passing current about said power factor meter, and a switch for selectively directing the charging current of either said bushing or said electrical apparatus through said power factor meter or through said shunt, said switch being arranged to direct the charging current of said electrical apparatus through said shunt when the charging current of said bushing passes through said meter and vice-versa.

6. The combination with electrical apparatus and an insulator bushing having a conductor extending through said bushing to said apparatus, of a power factor meter and means for directing the charging current of said apparatus through said meter and for by-passing at the same time the charging current of said bushing about said meter.

7. The combination with electrical apparatus of a bushing insulator for a conductor connected with said apparatus, shielded means for charging said conductor, means for collecting the charging and leakage currents of said bushing insulator, a power factor meter connected with said conductor, and means for diverting the charging and leakage current from said bushing insulator to the shield for said power factor meter to permit measurement of the power factor of said apparatus separately from said bushing.

8. The combination with electrical apparatus of a bushing insulator, a conductor connected with said apparatus and extending through said bushing insulator, means for charging said conductor, a shield for said charging means, means for collecting the charging and leakage currents of said bushing, a power factor meter connected with said conductor, means for directing the resultant charging and leakage current of said bushing through the current coils of said power factor meter, and means for diverting the charging current of said electrical apparatus to said shield to facilitate measurement of the power factor of said bushing insulator independently of the power factor of said apparatus.

9. The method of measuring the power factor of different portions of electrical apparatus while the portions are energized by a common charged conductor, said method comprising the steps of directing the charging current of one portion of said apparatus through a measuring set and at the same time by-passing the charging current of the remainder of said apparatus to a shunt circuit for said measuring set.

10. The combination with a polyphase electric circuit of electrical apparatus connected with each phase of said circuit, a housing for the apparatus for each phase, a pair of bushing insulators extending through each housing, a power factor meter, and means for separating the charging current for each bushing insulator from the charging current for the apparatus with which said insulator is connected and for separately directing to said power factor meter the charging current for each of said bushing insulators and for the apparatus in each of said housings.

RALPH HIGGINS.